(12) United States Patent  
Birtley

(10) Patent No.: US 6,988,294 B2  
(45) Date of Patent: Jan. 24, 2006

(54) TILT HINGE

(75) Inventor: Simon C. Birtley, Port Orange, FL (US)

(73) Assignees: Katoh Electrical Machinery Co., Ltd., Kanagawa (JP); Kem America Co., Inc., Port Orange, FL (US)

( * ) Notice: Subject to any disclaimer, the term of this patent is extended or adjusted under 35 U.S.C. 154(b) by 74 days.

(21) Appl. No.: 10/668,482

(22) Filed: Sep. 23, 2003

(65) Prior Publication Data

US 2004/0074050 A1    Apr. 22, 2004

(30) Foreign Application Priority Data

Oct. 16, 2002    (JP)    ............... 2002-302227

(51) Int. Cl.  
*E05D 11/08*    (2006.01)

(52) U.S. Cl. .................... 16/342; 16/340; 16/337

(58) Field of Classification Search .............. 16/342, 16/340, 337, 338; 348/794; 361/680, 681, 361/682, 683; 248/291.1, 292.12, 292.13, 248/292.14, 917–923; 403/70, 71, 84, 91, 403/101, 111, 103  
See application file for complete search history.

(56) References Cited

U.S. PATENT DOCUMENTS

| | | | | |
|---|---|---|---|---|
| 2,736,027 | A | * | 2/1956 | Parmelee ................ 2/8 |
| 4,018,104 | A | * | 4/1977 | Bland et al. ............ 74/531 |
| 4,781,422 | A | * | 11/1988 | Kimble ............... 361/680 |
| 5,697,125 | A | * | 12/1997 | Gannon .............. 16/342 |
| 6,081,969 | A | * | 7/2000 | Tanahashi et al. ........ 16/337 |
| 6,233,785 | B1 | * | 5/2001 | Tanahashi ............. 16/337 |
| 6,301,748 | B1 | * | 10/2001 | Su-Man ............... 16/342 |
| 6,421,878 | B1 | * | 7/2002 | Kaneko et al. .......... 16/330 |
| 6,467,129 | B1 | * | 10/2002 | Bae .................. 16/342 |
| 6,530,123 | B1 | * | 3/2003 | Wahlstedt ............ 16/342 |
| 6,539,582 | B1 | * | 4/2003 | Chae ................. 16/340 |
| 6,666,422 | B1 | * | 12/2003 | Lu et al. ............ 248/291.1 |

FOREIGN PATENT DOCUMENTS

| | | | |
|---|---|---|---|
| JP | 501149 | | 2/2000 |
| JP | 2001099133 A | * | 4/2001 |
| JP | 2001107941 A | * | 4/2001 |
| JP | 2003262214 A | * | 9/2003 |

* cited by examiner

*Primary Examiner*—Chuck Y. Mah  
(74) *Attorney, Agent, or Firm*—Notaro & Michalos P.C.

(57) ABSTRACT

A tilt hinge connecting a first member which constitutes a keyboard base and a second member which constitutes a display device of a small-sized office automation equipment, in which the first member and the second member are opened and closed with respect to each other. The tilt hinge is composed of: a holder attached to either of the first member or the second member; a shaft which is attached to either the other one of the first member and the second member while also attached to the holder so as to be rotatable with respect thereto and to be non-movable in an axial direction; a plurality of first friction disks inserting the shaft rotatably and movably in the axial direction through an insertion hole of each disk and held by the holder; a plurality of second friction disks inserting similarly the shaft through an insertion hole of each disk, being interposed between the first friction disks, restrained its rotation by the shaft and movably in the axial direction; and an elastic means attached to the shaft to cause the first friction disks and the second friction disks to press-contact each other in the axial direction.

10 Claims, 13 Drawing Sheets

TILT HINGE

BACKGROUND OF THE INVENTION

1. Field of the Invention

The present invention relates to a tilt hinge suitable for use in small-sized office automation equipment such as a laptop-type computer and a notebook-type computer, for connecting a keyboard base, a first member and a display device, a second member, so as to allow to pivot frictionally.

2. Description of the Related Art

A laptop-type computer or a notebook-type computer is composed of a keyboard base and a display device which is openably and closably attached to the keyboard base through tilt hinges. Such a computer is usually folded into two, but when in use, it is structured such that the display device is opened to the keyboard base. Since such types of computers are required to be as thin and compact as possible, tilt hinges are also required to have a small diameter and a high friction function. The following disclosure is well known as the one satisfying such a requirement.

Translated National Publication of Patent Application No. 2000-501149.

The friction hinge described in the above document has a structure that a plurality of washer-shaped clips each having a pair of arms are attached in piles in the axial direction to a holder non-rotatably, and through each pair of the arms a shaft is inserted press-contactedly, causing friction torque between the outer periphery of the shaft and the radial direction of each arm Since such a friction hinge of a well-known structure described above is aimed at obtaining friction torque by sandwiching a shaft between a pair of arms of a washer-shaped clip, in order to obtain a required value in friction torque with a small-diameter hinge, there arises a disadvantage of requiring a large amount of clips due to smallness in friction area of each clip. Further, when obtaining friction torque of 100 kg-mm with a shaft having a diameter of approximately 7 mm, which is a development requirement of the present invention, a still larger amount of clips become necessary, causing the friction hinge to be longer in size in the axial direction.

SUMMARY OF THE INVENTION

The object of the present invention is to provide a small-sized, small-aperture tilt hinge which is capable of generating required friction torque.

To attain the above object, the present invention discloses a hinge connecting a first member and a second member which are opened and closed with respect to each other in a manner to be friction-rotatable. The hinge comprises: a holder attached to either one of the first member or the second member; a shaft attached to either the other one of the first member or the second member while also attached to the holder so as to be rotatable with respect thereto and to be non-movable in the axial direction; a plurality of first friction disks inserting the shaft rotatably and movably in the axial direction through an insertion hole of each disk and held by the holder; a plurality of second friction disks inserting the shaft through an insertion hole of each disk, being interposed between the first friction disks, restrained its rotation by the shaft and movably in the axial direction; and an elastic means attached to the shaft to cause the first friction disks and the second friction disks to press-contact each other in the axial direction.

In the present invention described above, either one of the first friction disk or the second friction disk may be formed of a hard material, while the other is formed of a soft material.

Further in the present invention, the first friction disks may have locking portions on the outer periphery thereof so that they are locked in the holder, while the second friction disks may have locking portions to be locked to the shaft in the insertion hole thereof through which the shaft is inserted.

In the present invention, the elastic means may be composed of a nut attached on an end portion of the shaft, and spring washers interposed between the nut and either one of the first friction disk or the second friction disk, while the shaft being inserted through the insertion hole of the spring washer.

Furthermore in the present invention, the elastic means may be composed of a nut attached on an end portion of the shaft, and a compression spring elastically provided between the nut and either one of the first friction disk or the second friction disk.

Moreover in the present invention, instead of the nut, a caulking portion formed by caulking the end portion of the shaft may be used as a nut.

Further in the present invention, the holder may include a case portion containing all or at least a part of the first friction disks and the second friction disks.

Furthermore in the present invention, in the first friction disk and/or the second friction disk, an oil reserving portion may be provided for lubricating the press-contact portion between them, and on an outside of a locking groove of the holder in which the locking portion of the first friction disk is locked, a depressed portion may be given to prevent a trembling of the first friction disk to the locking groove.

DETAILED DESCRIPTION OF THE PREFERRED EMBODIMENTS

Hereinafter an embodiment of the present invention is explained with reference to the drawings.

Figure 1:
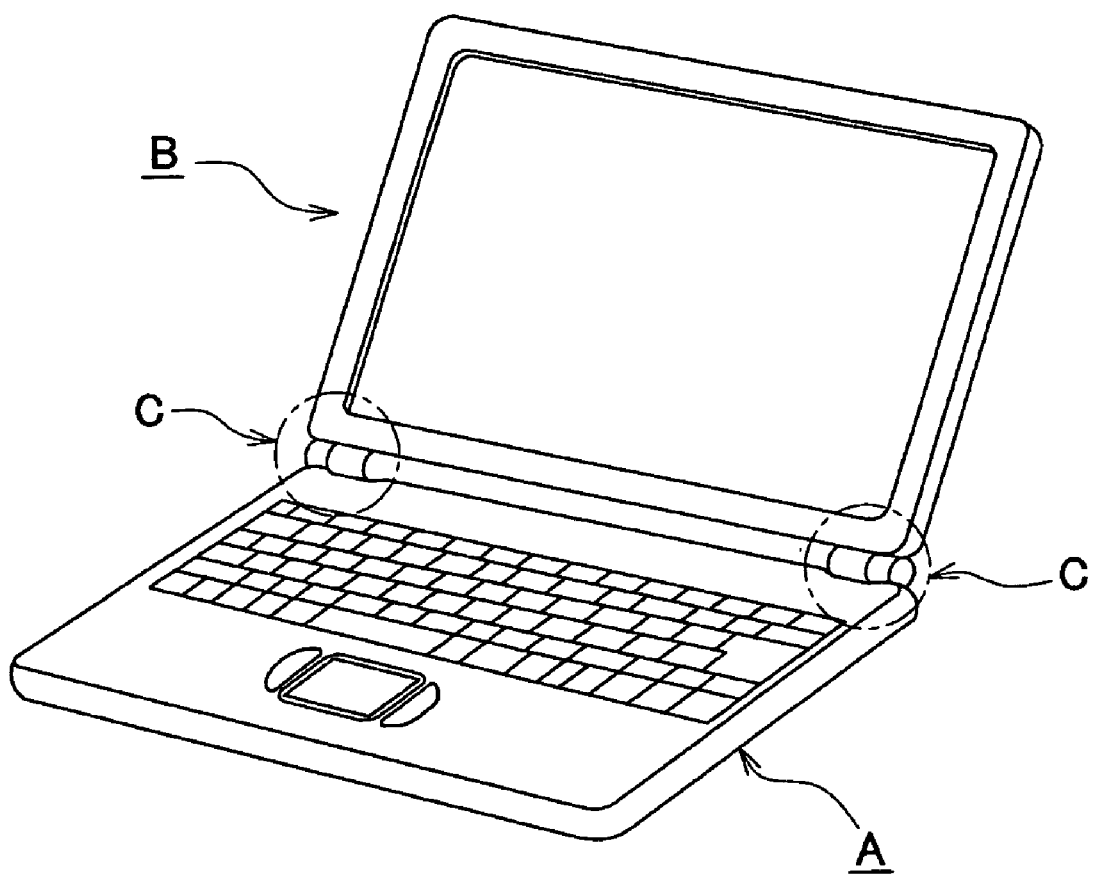
FIG. 1 is a perspective view of a notebook-type personal computer using a tilt hinge of the present invention.
Figure 2:
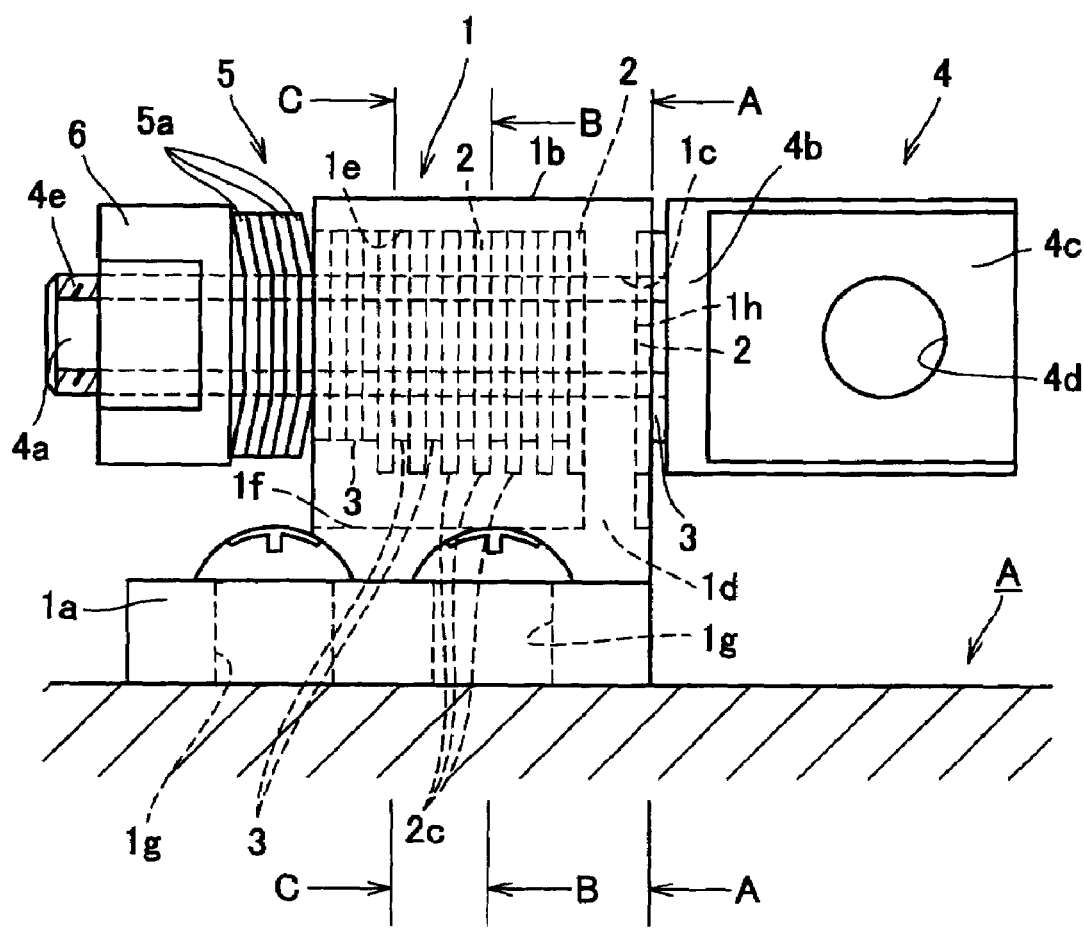
FIG. 2 is a front view of the tilt hinge of the present invention.
Figure 3:
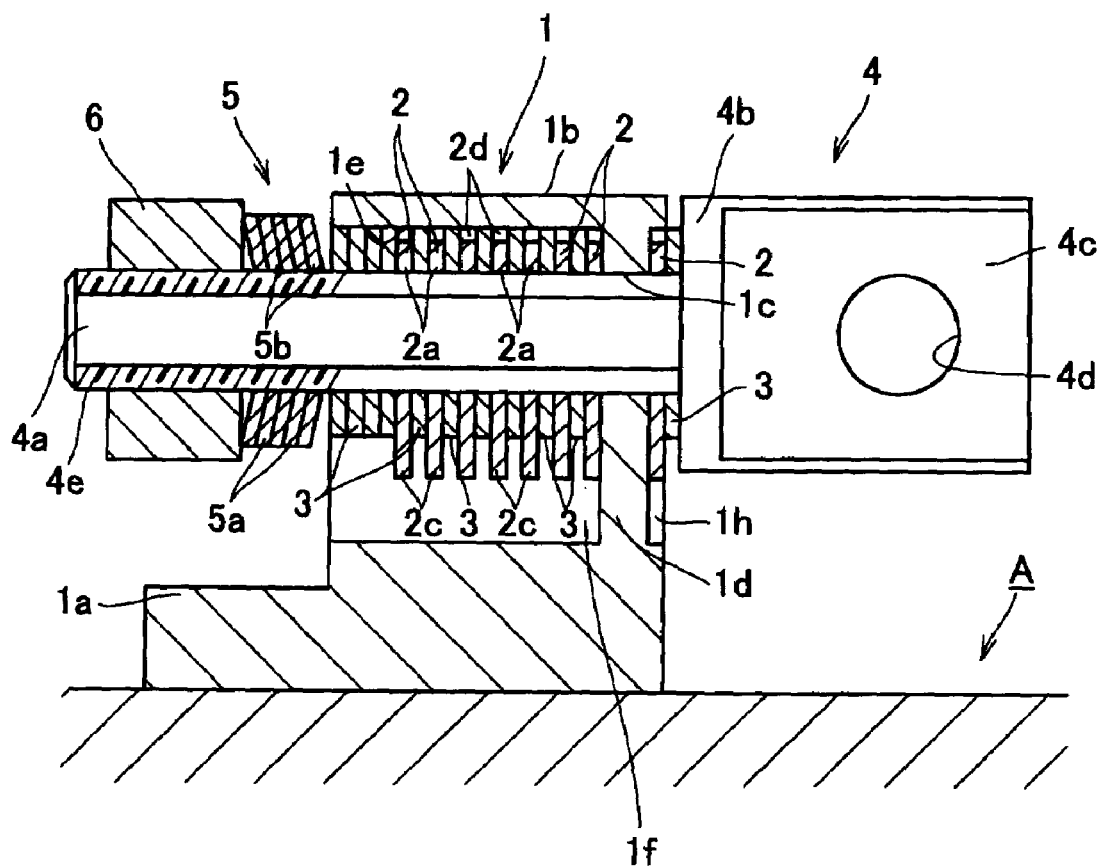
FIG. 3 is a vertical sectional view of FIG. 2.

FIG. 1 shows a notebook-type personal computer using tilt hinges of the present invention, where Reference Numeral A denotes a first member which constitutes a keyboard base side, and Reference Numeral B represents a second member which constitutes a display device side. The first member A and the second member B are connected by the tilt hinges of the present invention at the positions shown as a pair of C portions such that they can be opened and closed with respect to each other.

FIGS. 2 to 6 show the tilt hinge of the present invention. In the drawings, Reference Numeral 1 denotes a holder attached to, for example, the keyboard base A side of the notebook-type personal computer, which constitutes the first member. The holder is composed of an attachment portion 1a and a case portion 1b. The case portion 1b has a sidewall 1d with a bearing hole 1c provided on one side thereof, and a cavity portion 1e holding therein first friction disks 2 and second friction disks 3. The cavity portion 1e is provided with a locking groove 1f, which locks a locking portion 2c of the first friction disk 2. The attachment portion 1a is provided with attachment holes 1g and 1g.

In the bearing hole 1c provided in the sidewall 1d of the holder 1, a shaft 4 is rotatably supported with its small-diameter portion 4a. In the shaft 4, further to the small-diameter portion 4a, a flange portion 4b forming a large-diameter portion and an attachment portion 4c having a semicircular cross-sectional face are provided. To the attachment portion 4c is attached the second member B shown by an imaginary line B in FIGS. 4 to 6. It is noted that the attachment portion 4c may be attached to the first member A, while the holder 1 may be attached to the second member B. In the shaft 4, the small-diameter portion 4a is trimmed of its both sides, thereby showing an approximately elliptical cross-sectional face, and an attachment hole 4d is provided in the attachment portion 4c. It is noted that each cross-sectional shape of the small-diameter portion 4a and the attachment portion 4c is not limited to those described in the embodiment of the present invention. Such shapes can be various, including a polygonal shape.

Figure 4:
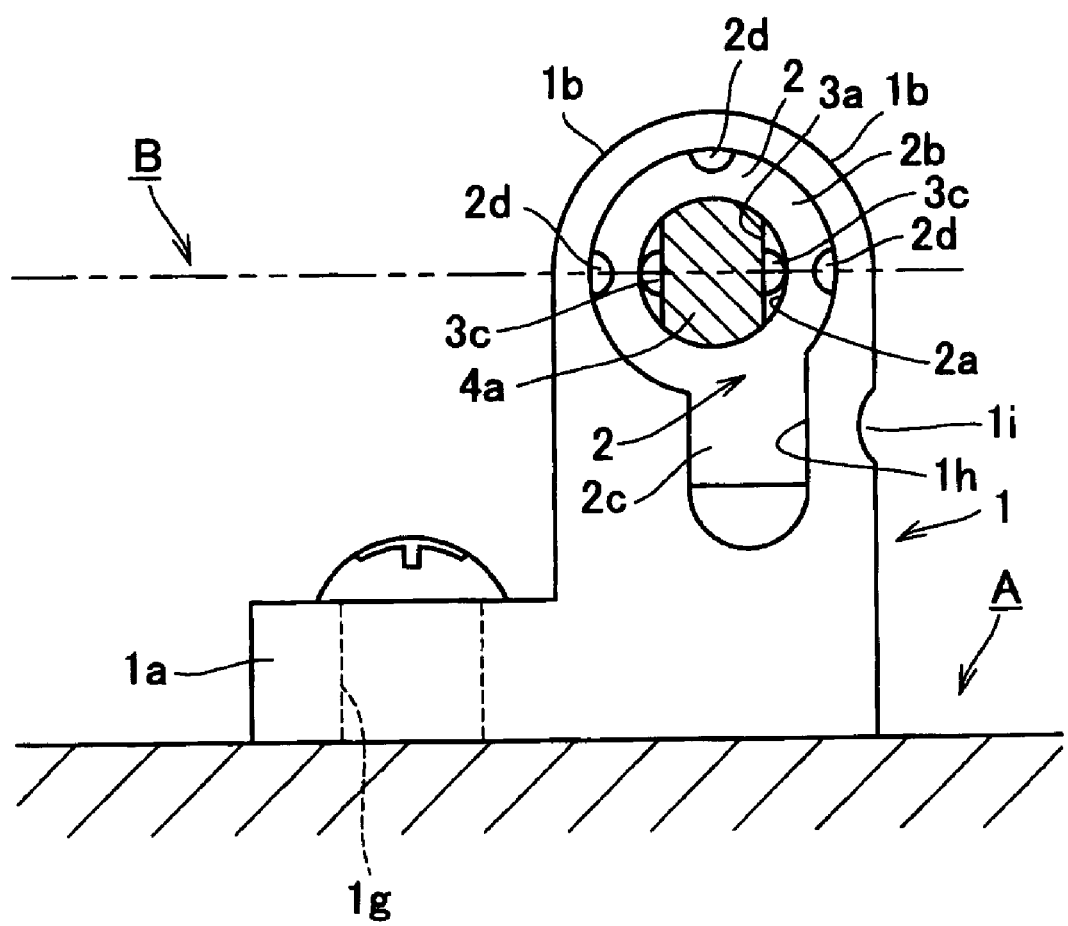
FIG. 4 is a sectional view taken along the A—A line in FIG. 2.
Figure 5:
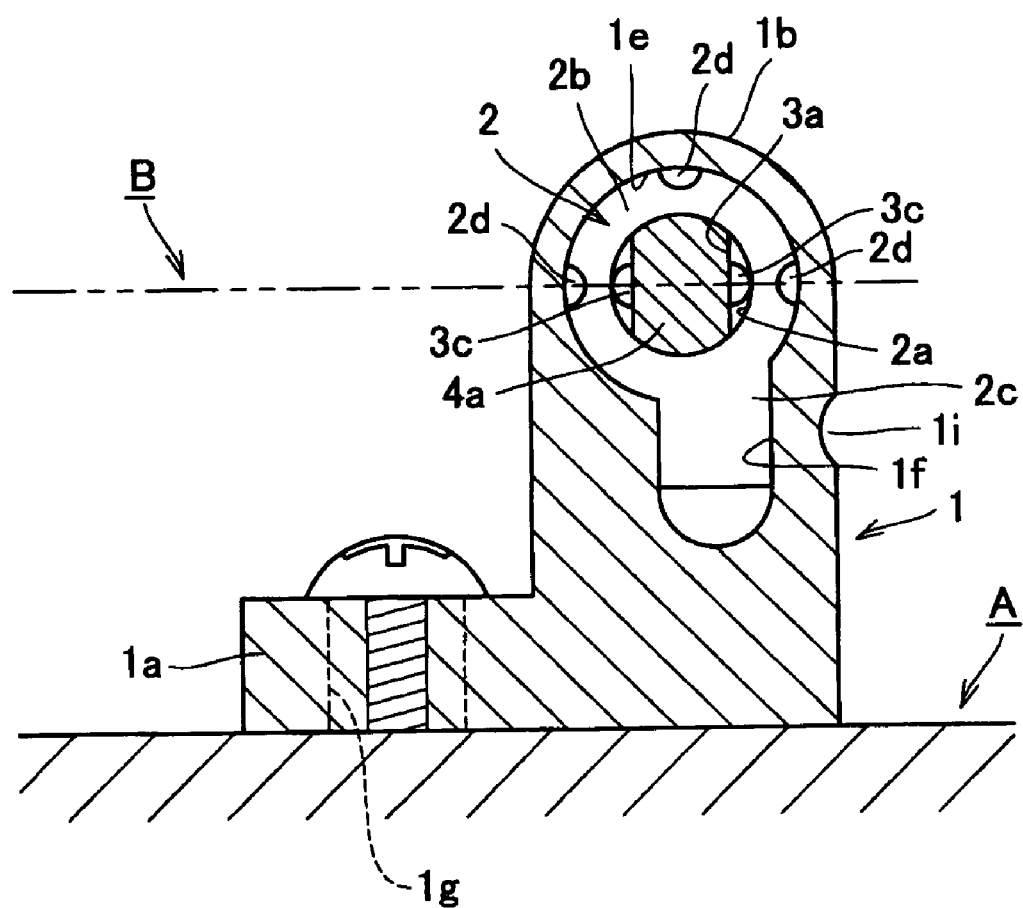
FIG. 5 is a sectional view taken along the B—B line in FIG. 2.
Figure 6:
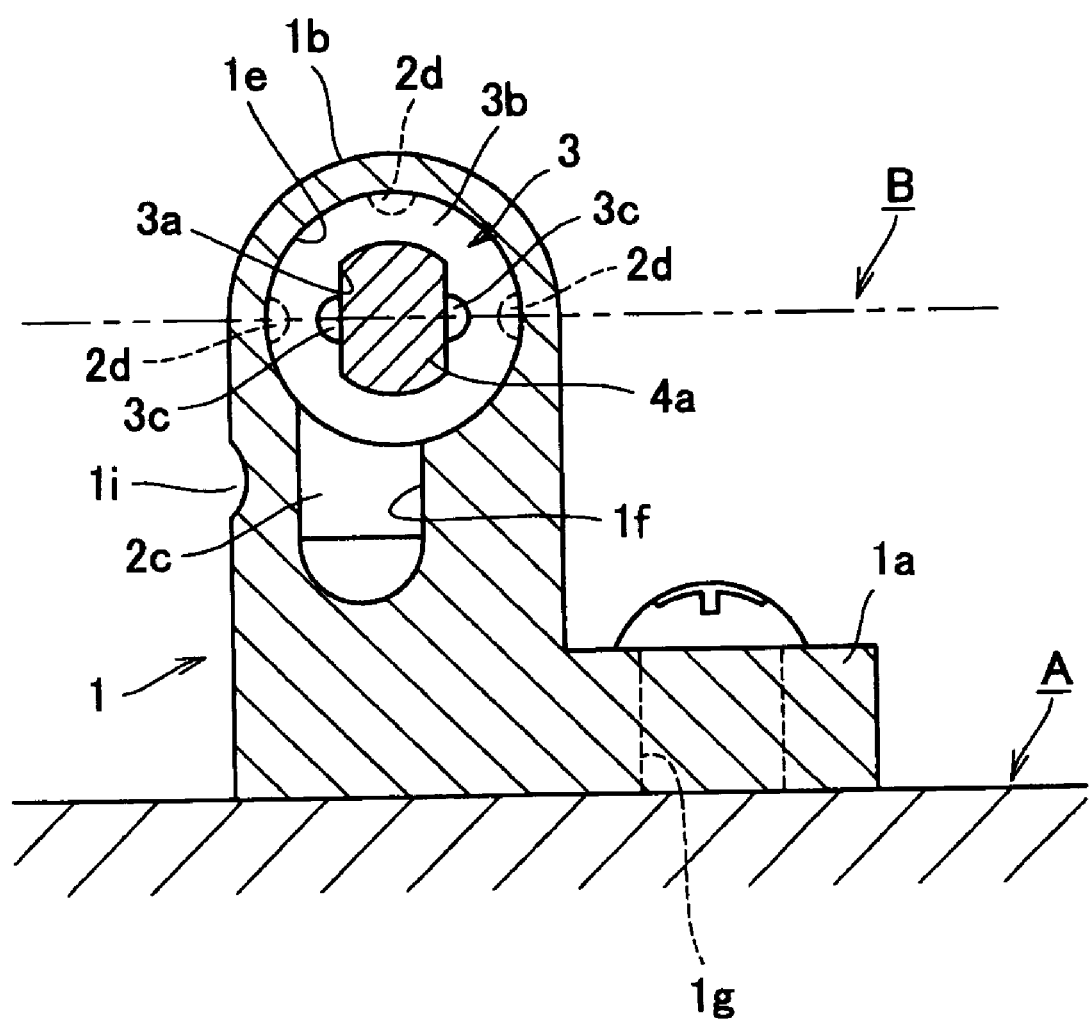
FIG. 6 is a sectional view taken along the C—C line in FIG. 2.
Figure 7:
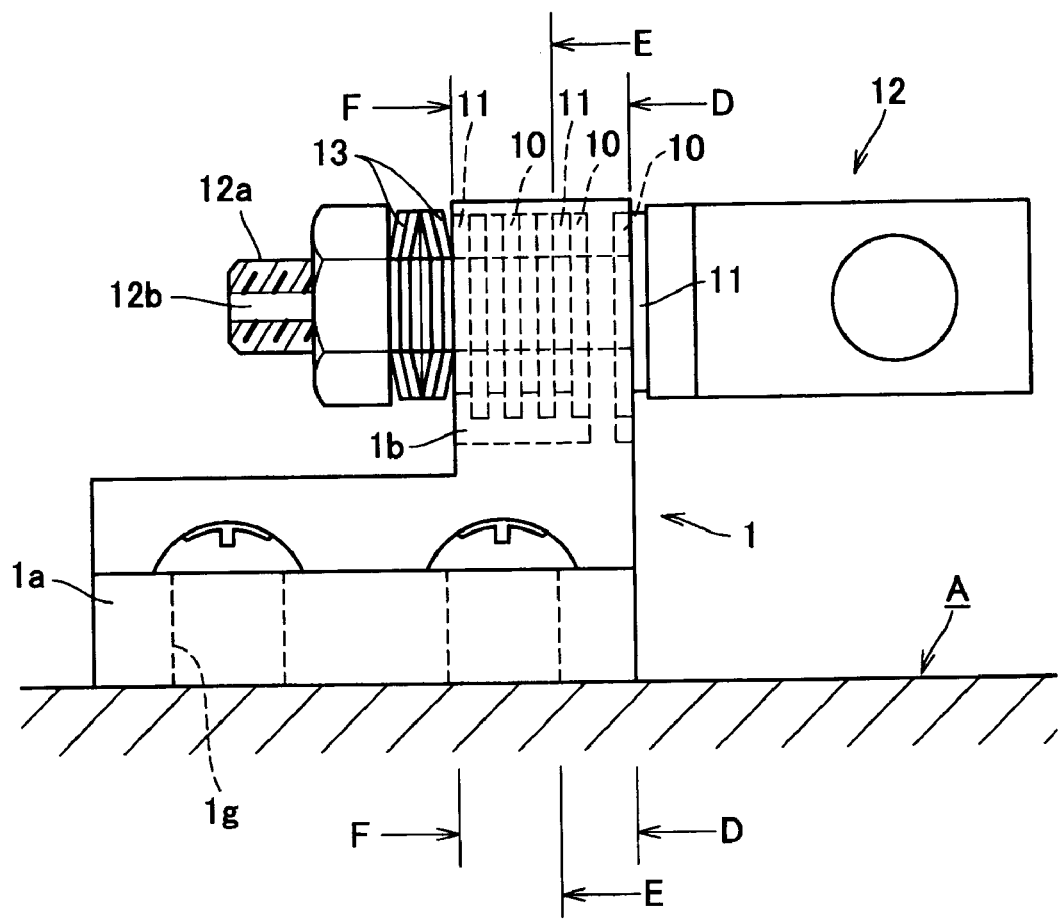
FIG. 7 is a front view of another embodiment of the tilt hinge of the present invention.
Figure 8:
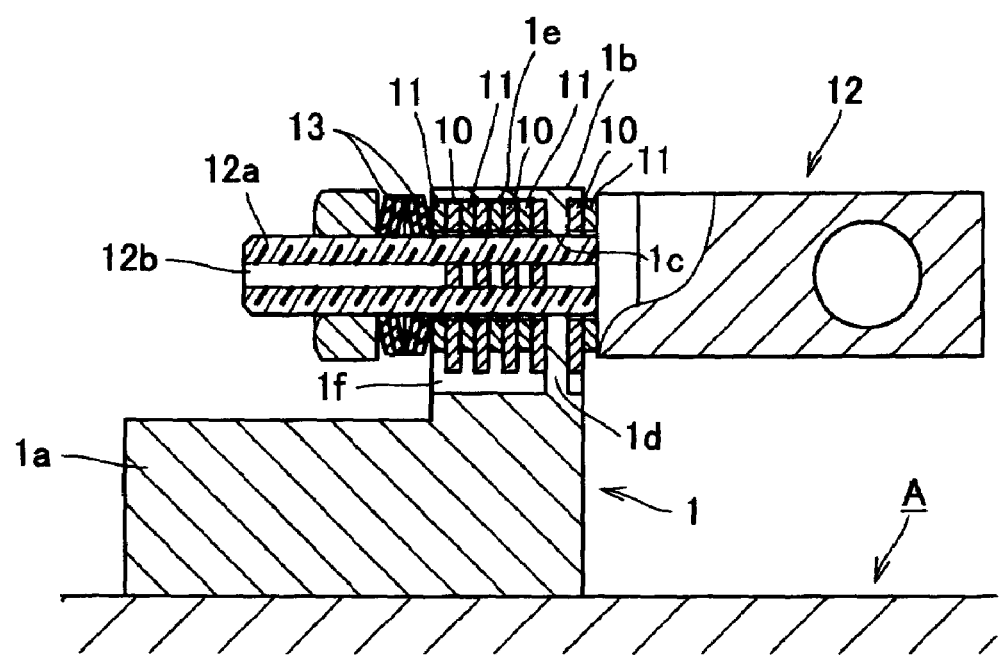
FIG. 8 is a vertical sectional view of FIG. 7.
Figure 9:
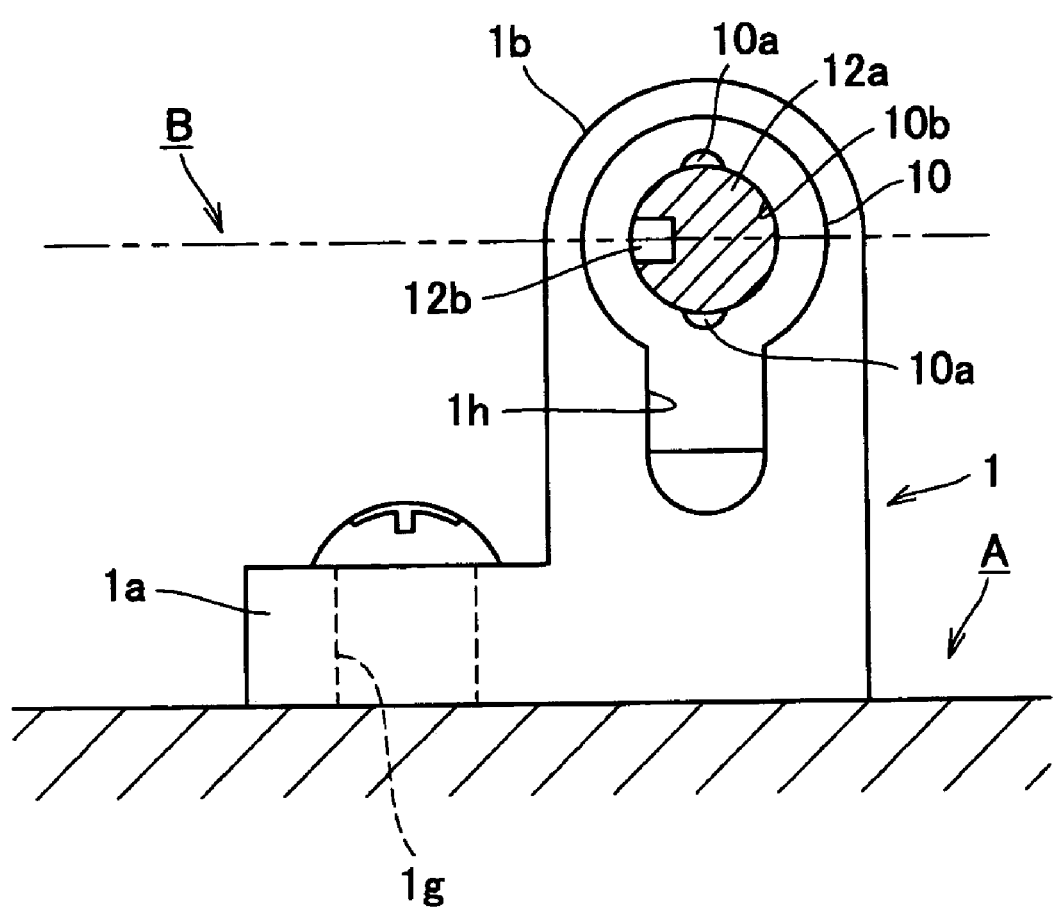
FIG. 9 is a sectional view taken along the D—D line in FIG. 7.
Figure 10:
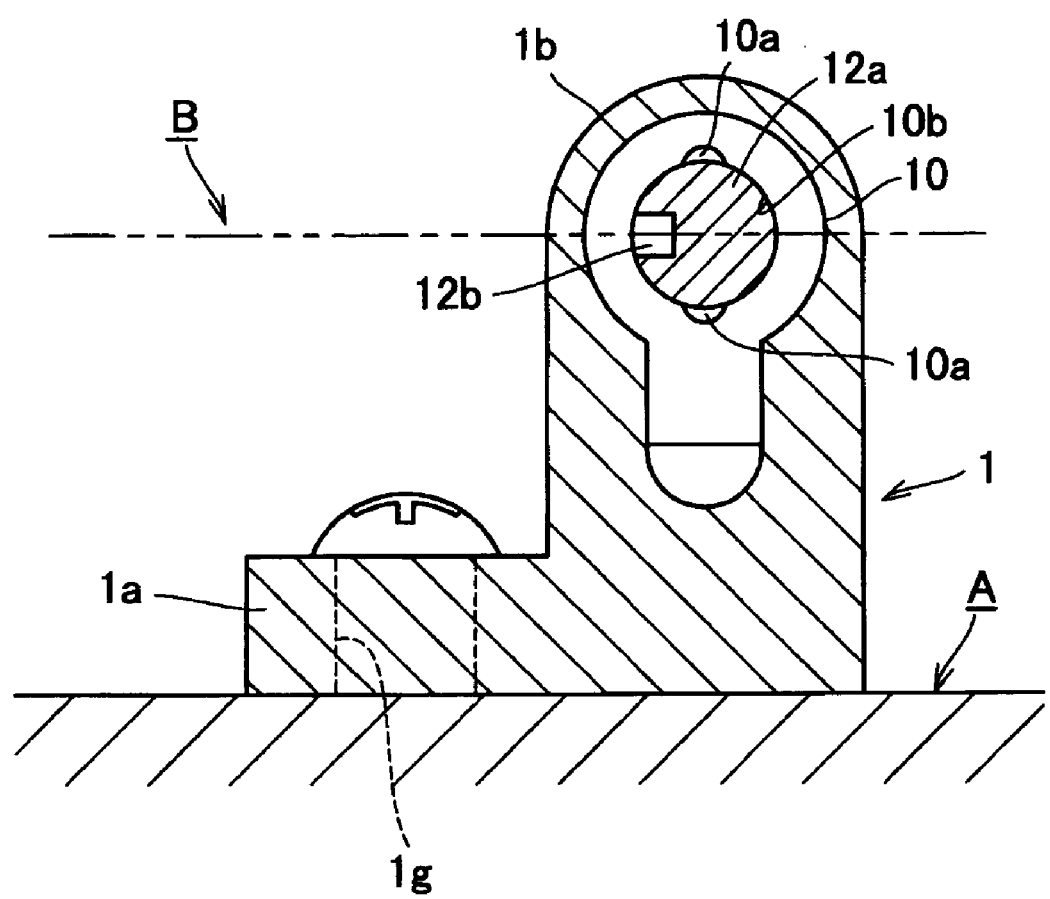
FIG. 10 is a sectional view taken along the E—E line in FIG. 7.
Figure 11:
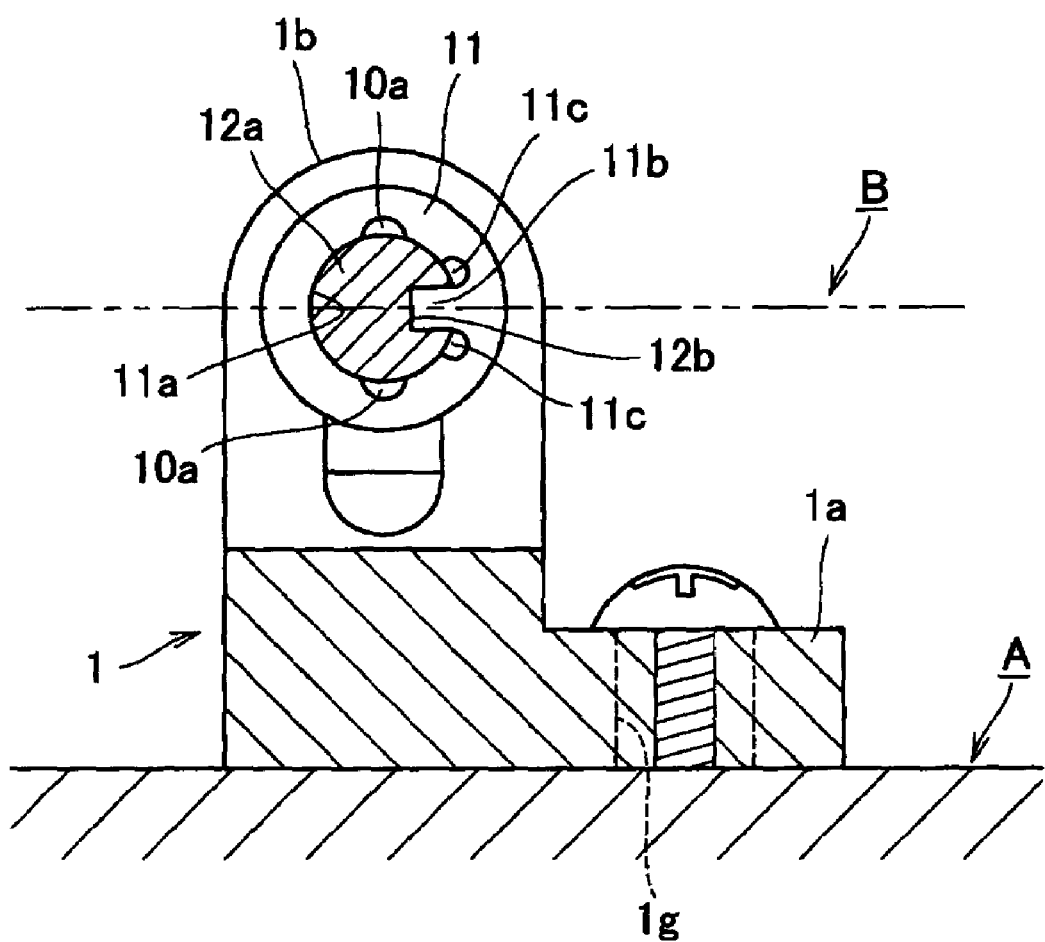
FIG. 11 is a sectional view taken along the F—F line in FIG. 7.

The first friction disk 2 is formed of a plate made from a hard and abrasion-resistant material such as SUS304CSP-1/2H, and composed of a friction generating portion 2b provided with a circular insertion hole 2a inserting the shaft 4, and the locking portion 2c protruding from the friction generation portion 2b. The first friction disk 2 comprises a plurality of plates each of which is housed in the cavity portion 1e of the holder 1, and fixed to the holder 1 by locking the locking portion 2c into a locking groove 1f in the cavity portion 1e, and a single sheet of the plate which is fixedly locked in a hollow portion 1h provided in the outside of the sidewall 1d of the holder 1. In the outer edge of the friction generating portion 3b, oil reserving portions 2d in a form of a plurality of notches are formed. It is noted that the position, quantity, and form for providing the oil reserving portion 2d in the first friction disk 2 are not limited to those described in the embodiment of the present invention. The oil reserving portion 2d may be provided along an inner periphery of the circular insertion hole 2a, or in the friction generating portion 2b by forming therein a small hole or a concave portion. It is also noted that as shown in FIGS. 4 to 6 particularly, on the outside of the case portion 1b of the holder 1, a depressed portion 1i is given to prevent a trembling of the locking portion 2c of the first friction disk 2, which is lockedly inserted in the locking groove 1f.

The second friction disk 3 is also formed of a disk-shaped plate made from a hard and abrasion-resistant material such as SUS304CSP-1/2H. It includes the friction generating portion 3b provided with a deformed insertion hole 3a through which the shaft 4 is inserted, and an oil reserving portion 3c formed by a notch provided in the deformed insertion hole 3a. The second friction disks 3 comprise a plurality of disks where both sides or one side of each disk are/is in contact with the first friction disk 2 in the cavity portion 1e; a plurality of disks piled together to be used as a spacer; and the one disposed between the flange portion 4b of the shaft 4 on the outside of the holder portion 1 and the first friction disk 2. It is noted that those second friction disks 3 used as a spacer also may be an alternate arrangement of each of the first friction disks 2 and the second friction disks 3.

Reference Numeral 5 is an elastic means composed of a plurality of disk springs or spring washers 5a and 5a. The elastic means is elastically provided between the outmost one of the second friction disks 3 and the clamping nut 6 fitted in a male screw portion 4e provided in the small-diameter portion 4a, while inserting the small-diameter portion 4a of the shaft 4 into a circular-shaped insertion hole 5b provided along the axial direction of each center portion thereof.

Therefore, by clamping of the clamping nut 6, the first friction disk 2 and the second fiction disk 3 being adjacent to each other are strongly contactedly pressed. Here, rotation of the holder 1 or the shaft 4 causes respective friction generating portions 2b and 3b of the first friction disk 2 and the second friction disk 3 to contact each other on the surfaces thereof, whereby the friction area thereof increases and causes a strong friction torque onto the friction surface. The friction torque for the attachment portion 1a of the holder 1 and the attachment portion 4c of the shaft 4 both having an outer diameter of 7 mm, is approximately 100 kg-mm at maximum.

FIGS. 7 to 11 show another embodiment of a tilt hinge of the present invention, and the basic structure thereof is identical to the one for the embodiment referred earlier. The points of difference are: a first friction disk 10 is structured with a hard material which is prepared by heat-treatment of SK-5 for example, while a second friction disk 11 is structured with a soft material such as phosphor bronze C5210P-H; the shape of a first friction disk 10; an oil reserving portion 10a is provided along the inner periphery of an insertion hole 10b; a locking groove 12b is provided in the axial direction in an small-diameter portion 12a of a shaft 12, thereby a second friction disk 11 non-rotatably attached to the small-diameter portion 12a of the shaft 12 allows a locking piece 11b to protrude toward a portion of the insertion hole 11a so that the locking piece 11b fits into the locking groove 12b; none of the second friction disks 11 is used as a spacer; disk springs 13 are not faced toward the same direction as in the aforementioned embodiments, but elastically arranged with one half set thereof confronting the other half set. The rest of the constituents are identical to the corresponding ones in the embodiment described earlier, thus the explanation thereof will be omitted here. Incidentally, Reference Numeral 11c denotes an oil reserving portion of the second friction disk 11.

Figure 12:
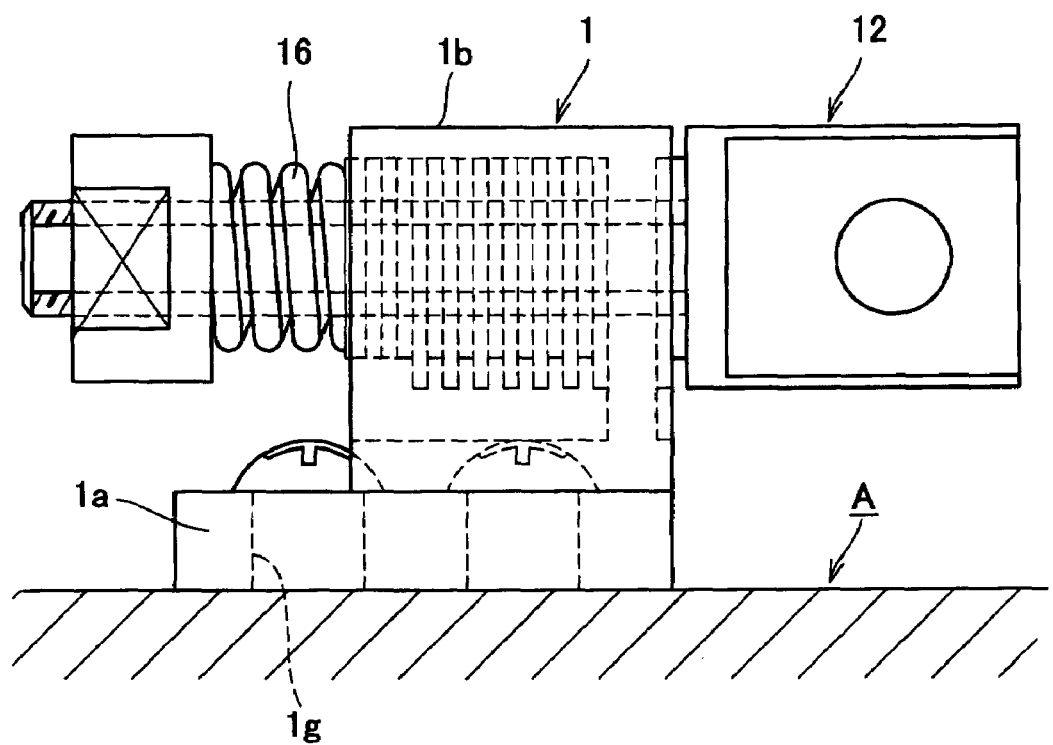
FIG. 12 is a front view of still another embodiment of the tilt hinge of the present invention.

FIG. 12 shows still another embodiment of a tilt hinge of the present invention. According to the drawing, it differs from each of the embodiments described earlier on the point that a compression spring 15 is used as an elastic means instead of a disk spring or a spring washer.

With this embodiment, the object of the present invention can also be attained. The constituents without reference numerals are identical to those in the embodiments described earlier, and will not be explained here.

Figure 13:
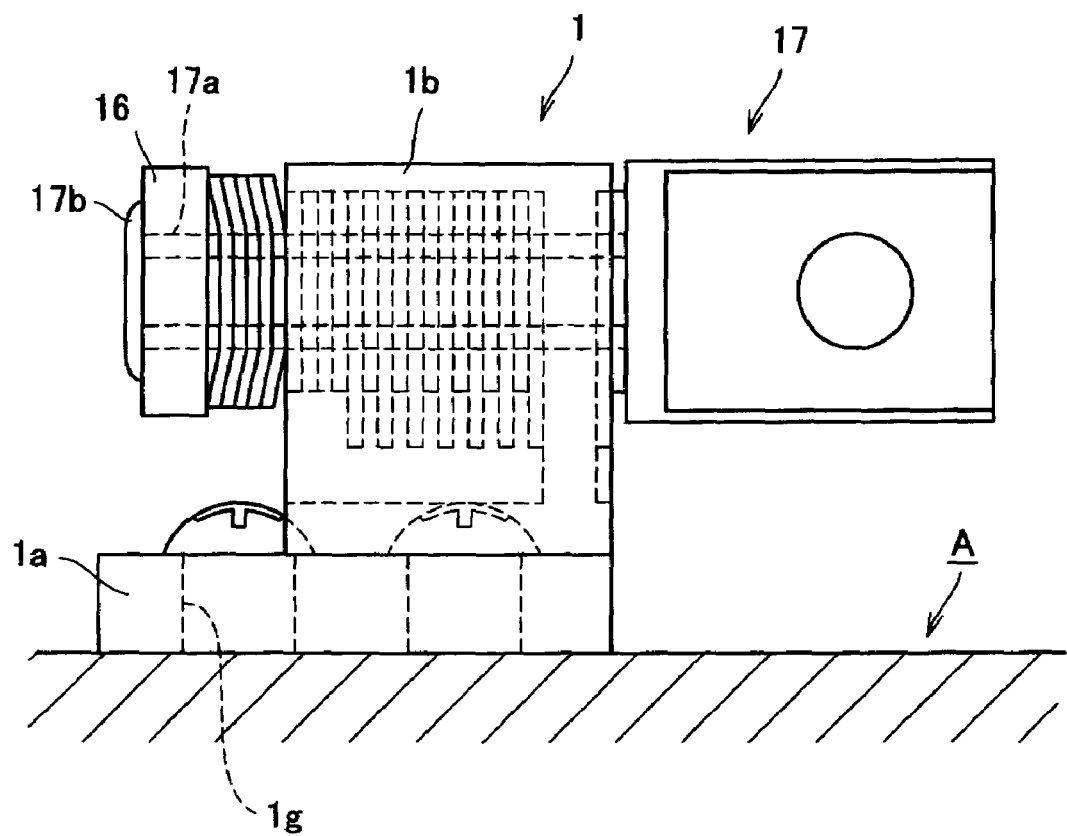
FIG. 13 is a front view of yet another embodiment of the tilt hinge of the present invention.

FIG. 13 shows yet another embodiment of a tilt hinge of the present invention, where a retaining washer 16 and a caulking portion 17b of a small-diameter portion 17a of a shaft 17 are used instead of the clamping nut in the embodiments described earlier.

With this embodiment, the object of the present invention can also be attained, and its simpler structure allows lowering of the manufacturing cost.

It should be noted that in the above embodiments, for the first friction disk and the second friction disk, structure, shape, and way of combination, as well as whether to use a hard material only or to arrange hard and soft materials alternately are not limited, except that both the first friction disks and the second friction disks should be piled in at least two pieces. Further in the above embodiments, basically used is lubricating oil, but it can be omitted by fluorine coating or nitriding of respective washer surfaces.

What is claimed is:

1. A tilt hinge for connecting a first member and a second member which are opened and closed with respect to each other in a manner to be friction-rotatable, said hinge comprising:
    a holder composed of an attachment portion, a case portion having a cavity portion with a locking groove mounted on said attachment portion, and a sidewall with a bearing hole mounted on one side of said cavity portion, said bearing hole having the same axis with said cavity portion, and attached to either one of said first member or said second member;
    a shaft composed of a deformed small-diameter portion, a flange portion and an attachment portion, which shaft is rotatably mounted on said bearing hole with its small diameter portion penetrating in an axial direction of said cavity portion, and said attachment portion of said shaft being attached to either the other one of the first member or the second member;
    a plurality of first friction disks with locking portions, said first friction disks being engaged on the small-diameter portion of said shaft in an axial direction by a circular through-hole of each one of said first friction disks, and said first friction disks being held in said cavity portion of said holder, and said locking portions being engaged with said locking groove;
    a plurality of second friction disks having deformed through-holes in the central axial direction, the shaft extending through said deformed through-holes of each one of said second friction disks, and thus connecting with said deformed through-holes, and being interposed between said first friction disks, and held in the cavity portion of said holder rotatable along with said shaft;
    an elastic means provided on said shaft for press-contacting with each other the first friction disks and the second friction disks; and
    fastening means attached on an end of said small diameter portion of said shaft in order to create elasticity in said elastic means.

2. A tilt hinge according to the claim 1, wherein either one of the first friction disks or the second friction disks are formed of a hard material, while either the other one to be formed of a soft material.

3. A tilt hinge according to claim 1, wherein the second friction disks comprise engagement lugs engaging the shaft in the through-hole thereof through which the shaft is inserted.

4. A tilt hinge according to claim 1, wherein said elastic means is composed of disk springs and/or spring washers interposed between said fastening means and either one of the first friction disk or the second friction disk, while the shaft being inserted through the insertion hole of said spring washer.

5. A tilt hinge according to claim 1, wherein the elastic means is composed of a compression spring elastically provided between a nut and either one of the first friction disk or the second friction disk.

6. A tilt hinge according to claim 1, wherein said fastening means comprises a caulking portion at an end of said shaft.

7. A tilt hinge according to claim 1, wherein said said fastening means comprises a clamping nut fitted in a male screw portion provided in said small diameter portion of said shaft.

8. A tilt hinge according to claim 1, wherein, in the first friction disks and/or the second friction disks, an oil reserving portion is provided for lubricating a press-contact portion between them.

9. A tilt hinge according to claim 1, wherein, said locking groove of said holder contains each said locking portion of the first friction disks, said case portion having a depressed portion on an outer surface thereof adjacent the locking groove to prevent a trembling of the first friction disks with respect to the locking groove.

10. A tilt hinge for connecting a first member and a second member which are opened and closed with respect to each other in a manner to be friction-rotatable, said hinge comprising:
    a holder composed of attachment portion, and a case portion constitute of cavity portion with a locking groove mounted on said attachment portion, and a sidewall with bearing hole mounted on one side of said cavity portion, having the same axis with said cavity portion, and attached to either one of said first member or said second member;
    a shaft composed of a deformed small-diameter portion, a flange portion and an attachment portion, which is rotatably mounted on said bearing hole with its small diameter portion penetrating in an axial direction of said cavity portion, and said attaching portion of said shaft is attached to either the other one of the first member or the second member;
    a plurality of first friction disks with locking portions, said disks inserted at deformed small-diameter portion of said shaft in an axial direction through circular through-hole of each one of disks, and said friction disks held by said cavity portion of said holder, and said locking portions are engaged with said locking groove;
    a plurality of second friction disks having deformed through-holes in the central axial direction, inserting the shaft through said insertion holes of each one of said disks, and thus connecting with said deformed insertion holes, being interposed between said first friction disks, and held in the cavity portion of said holder rotatable along with said shaft;
    an elastic means provided on said shaft for press-contacting with each other the first friction disks and the second friction disks; and
    fastening means attached on an end of said small diameter portion of said shaft in order to create elasticity in said elastic means;
    said locking groove containing each said locking portion of the first friction disk, and said case portion having a depressed portion on an outer surface thereof adjacent the locking groove to prevent a trembling of the first friction disk with respect to the locking groove.

* * * * *